United States Patent [19]
Okumura et al.

[11] Patent Number: 5,231,477
[45] Date of Patent: Jul. 27, 1993

[54] COMB FILTER

[75] Inventors: Naoji Okumura, Ibaraki; Hirohiko Sakashita, Nara, both of Japan

[73] Assignee: Matsushita Electric Industrial Co., Ltd., Osaka, Japan

[21] Appl. No.: 700,855

[22] Filed: May 16, 1991

[30] Foreign Application Priority Data

May 29, 1990 [JP] Japan .................. 2-139203

[51] Int. Cl.5 .............................. H04N 9/64
[52] U.S. Cl. ........................ 358/31; 358/36
[58] Field of Search .............. 358/31, 36, 21 R

[56] References Cited

U.S. PATENT DOCUMENTS

| | | | |
|---|---|---|---|
| 4,703,342 | 10/1987 | Takahashi | 358/31 |
| 4,845,547 | 7/1989 | Naimpally | 358/31 |
| 4,980,737 | 12/1990 | Umegawa | 358/31 |
| 4,985,757 | 1/1991 | Yasuki et al. | 358/31 |

FOREIGN PATENT DOCUMENTS

| | | | |
|---|---|---|---|
| 0057881 | 4/1983 | Japan | 358/31 |
| 0039185 | 3/1984 | Japan | 358/31 |
| 0186095 | 8/1986 | Japan | 358/31 |

Primary Examiner—Alvin E. Oberley
Assistant Examiner—Minsun Oh
Attorney, Agent, or Firm—Pollock, VandeSande & Priddy

[57] ABSTRACT

A comb filter serves to process an input digital video signal which is derived from an analog video signal by a analog-to-digital conversion including a sampling process responsive to a system clock signal. The comb filter includes a separating device for separating the input video signal into a plurality of video signals which are offset with each other in timing and which have a clock rate equal to 1/N times a clock rate of the system clock signal where N denotes a predetermined natural number greater than 1. A first delaying device serves to delay a first output signal of the separating device. A chroma signal processor separates a first chroma signal in response to the first output signal of the separating device and an output signal of the first delaying device. A first subtracter serves to subtract the first chroma signal from the output signal of the first delaying device. A second delaying device serves to delay a second output signal of the separating device. An interpolating device serves to interpolate the first chroma signal into a second chroma signal to compensate for a difference in timing between the output signal of the second delaying device and the first chroma signal. A second subtracter serves to subtract the second chroma signal from the output signal of the second delaying device. A combining device serves to combine an output signal of the first subtracter and an output signal of the second subtracter into a luminance signal.

9 Claims, 4 Drawing Sheets

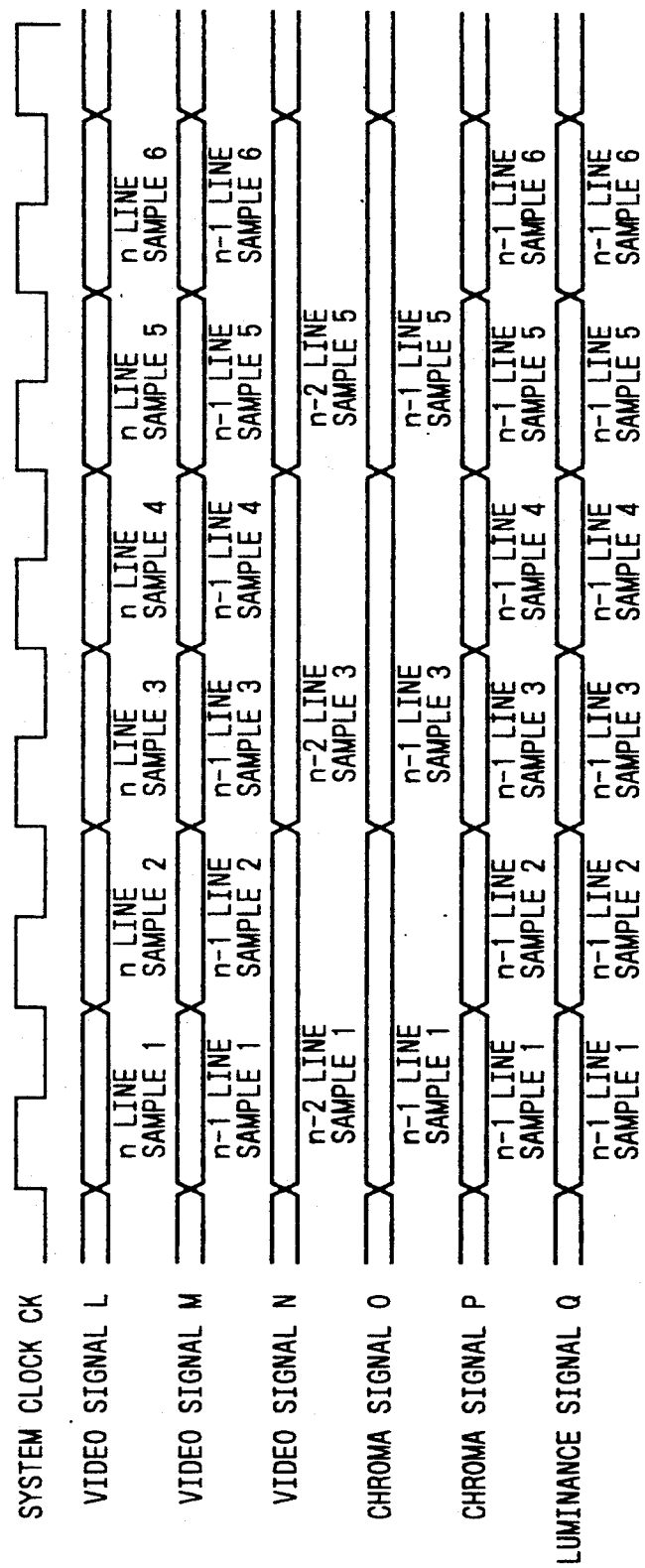

COMB FILTER

BACKGROUND OF THE INVENTION

This invention relates a comb filter usable as a Y-signal/C-signal separation filter in color video systems and color television receivers.

In general, color television receivers and color video systems include a filtering device for separately deriving a luminance signal (a Y signal) and a chroma signal (a color signal or a C signal) from a composite color video signal. Some of such Y/C signal separation devices include comb-type digital filters. As will be explained later, a prior art comb filter has some problems.

SUMMARY OF THE INVENTION

It is an object of this invention to provide an improved comb filter.

A first aspect of this invention provides a comb filter for processing an input digital video signal which is derived from an analog video signal by an analog-to-digital converter including a sampling process responsive to a system clock signal, the comb filter comprising separating means for separating the input video signal into a plurality of video signals which are offset from each other in timing and which have a clock rate equal to 1/N times a clock rate of the system clock signal where N denotes a predetermined natural number greater than 1; first delaying means for delaying a first output signal of the separating means; chroma signal processing means for separating a first chroma signal in response to the first output signal of the separating means and an output signal of the first delaying means; first subtracting means for subtracting the first chroma signal from the output signal of the first delaying means; second delaying means for delaying a second output signal of the separating means; interpolating means for interpolating the first chroma signal into a second chroma signal to compensate for a difference in timing between the output signal of the second delaying means and the first chroma signal; second subtracting means for subtracting the second chroma signal from the output signal of the second delaying means; and combining means for combining an output signal of the first subtracting means and an output signal of the second subtracting means into a luminance signal.

A second aspect of this invention provides a comb filter for processing an input digital video signal which is derived from an analog video signal by a analog-to-digital conversion including a sampling process responsive to a system clock signal, the comb filter comprising first delaying means responsive to the system clock signal for delaying the input video signal; second delaying means, responsive to a clock signal having a frequency equal to 1/N times a frequency of the system clock signal, for delaying an output signal of the first delaying means, where N denotes a predetermined natural number greater than 1; chroma signal processing means for separating a first chroma signal in response to the input video signal, the output signal of the first delaying means, and an output signal of the second delaying means; interpolating means for interpolating the first chroma signal into a second chroma signal which has a clock rate corresponding to the system clock signal; and subtracting means for subtracting the second chroma signal from the output signal of the first delaying means to separate a luminance signal.

BRIEF DESCRIPTION OF THE DRAWINGS

FIG. 5 is a timing diagram showing various signals in the comb filter of FIG. 4.

DESCRIPTION OF THE PRIOR ART

Figure 1:
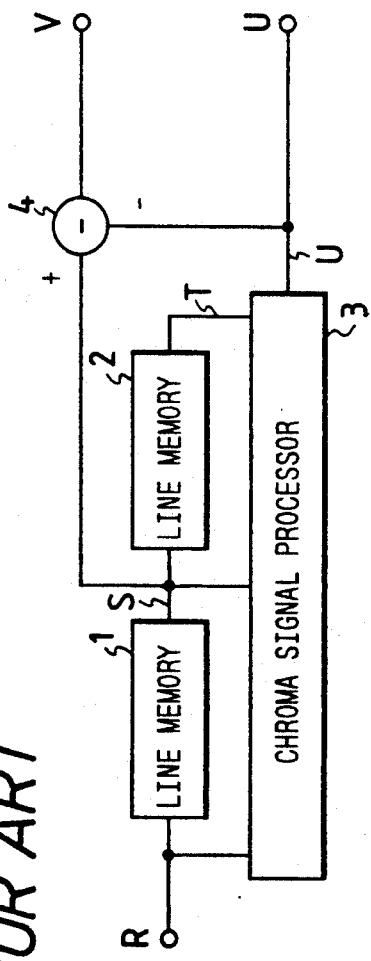
FIG. 1 is a block diagram of a prior art comb filter.

As shown in FIG. 1, a prior art comb filter includes line memories 1 and 2, a chroma signal processor 3, and a subtracter 4. The line memories 1 and 2 operate in response to a system clock signal fed from a clock signal generator (not shown). The line memory 1 delays a digitized input video signal R by a time corresponding to one line. The digitized video signal R is derived from an analog video signal by an analog-to-digital conversion including a sampling process with a predetermined sampling frequency equal to the frequency of the system clock signal. The line memory 2 delays the output video signal S from the line memory 1 by a time corresponding to one line. The input video signal R, the output video signal S from the line memory 1, and the output video signal T from the line memory 2 represent image information on three successive lines respectively. The chroma signal processor 3 processes the video signals R, S, and T, and separates a chroma signal (a color signal, a C signal) U by using the chroma vertical correlation that the chroma signal is inverted alternately with respect to lines. The subtracter 4 subtracts the chroma signal U from the video signal S, and thereby derives a luminance signal V. In this way, the input video signal R is separated into the luminance signal V and the chroma signal U.

The horizontal resolution is approximately proportional to the sampling frequency. Accordingly, to raise the horizontal resolution, it is necessary to increase the sampling frequency. In general, the increased sampling frequency necessitates a larger-scale circuit. For example, doubling the sampling frequency requires the scale of a circuit to be doubled or more.

DESCRIPTION OF THE FIRST PREFERRED EMBODIMENT

Figure 2:
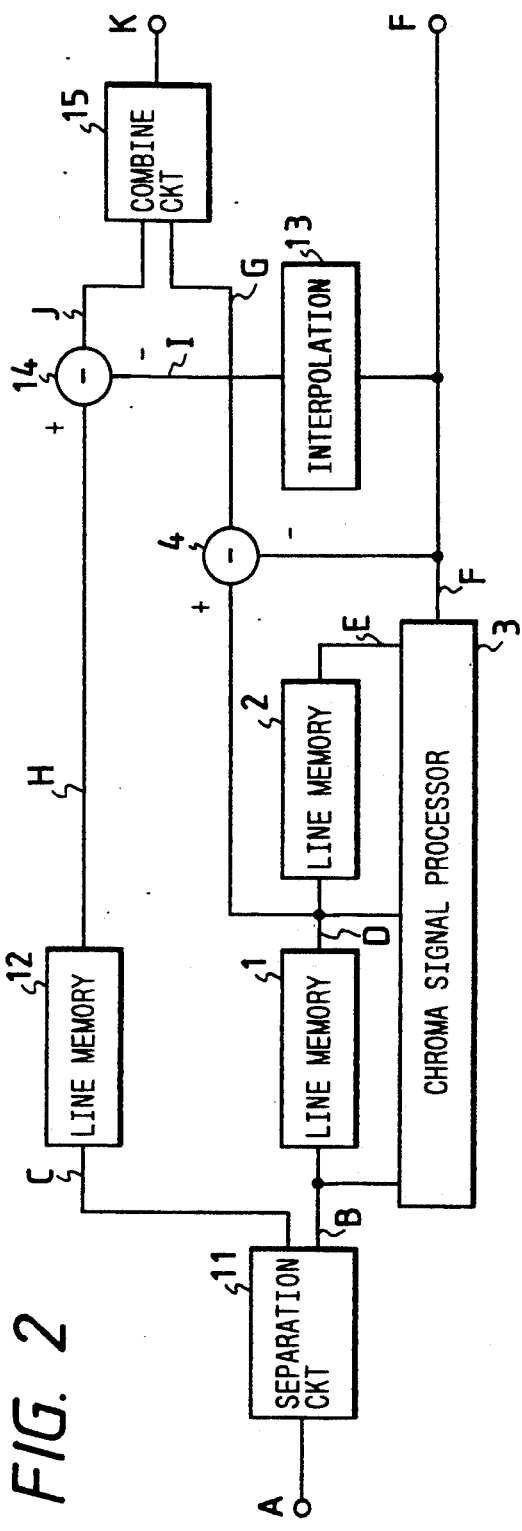
FIG. 2 is a block diagram of a comb filter according to a first embodiment of this invention.

With reference to FIG. 2, a comb filter of a first embodiment of this invention includes a separation circuit 11 which separates a digitized input video signal A into two video signals B and C. The input video signal A is derived from an analog video signal by an analog-to-digital conversion including a sampling process with a predetermined sampling frequency equal to the frequency of a system clock signal.

The comb filter also includes line memories 1 and 2, a chroma signal processor 3, and a subtracter 4. The line memory 1 delays the video signal B by a time corresponding to one line. The line memory 2 delays the output video signal D from the line memory 1 by a time corresponding to one line. The video signal B, the output video signal D from the line memory 1, and the output video signal E from the line memory 2 represent image information on three successive lines respectively. The chroma signal processor 3 processes the video signals B, D, and E, and separates a chroma signal (a color signal, a C signal) F by using the chroma vertical correlation that the chroma signal is inverted alternately with respect to lines. The chroma signal F is outputted from the comb filter. The subtracter 4 subtracts the chroma signal F from the video signal D, and thereby derives a first luminance signal G.

Further, the comb filter includes a line memory 12, an interpolation circuit 13, a subtracter 14, and a combining circuit 15. The line memory 12 delays the video signal C by a time corresponding to one line. The interpolation circuit 13 generates a new chroma signal I from the chroma signal F through an interpolation process. The subtracter 14 substracts the chroma signal I from the output video signal H from the line memory 12, and thereby derives a second luminance signal J. The combining circuit 15 combines the first luminance signal G and the second luminance signal J into a final luminance signal K. The final luminance signal K is outputted from the comb filter. In this way, the input video signal A is separated into the chroma signal F and the luminance signal K.

Figure 3:
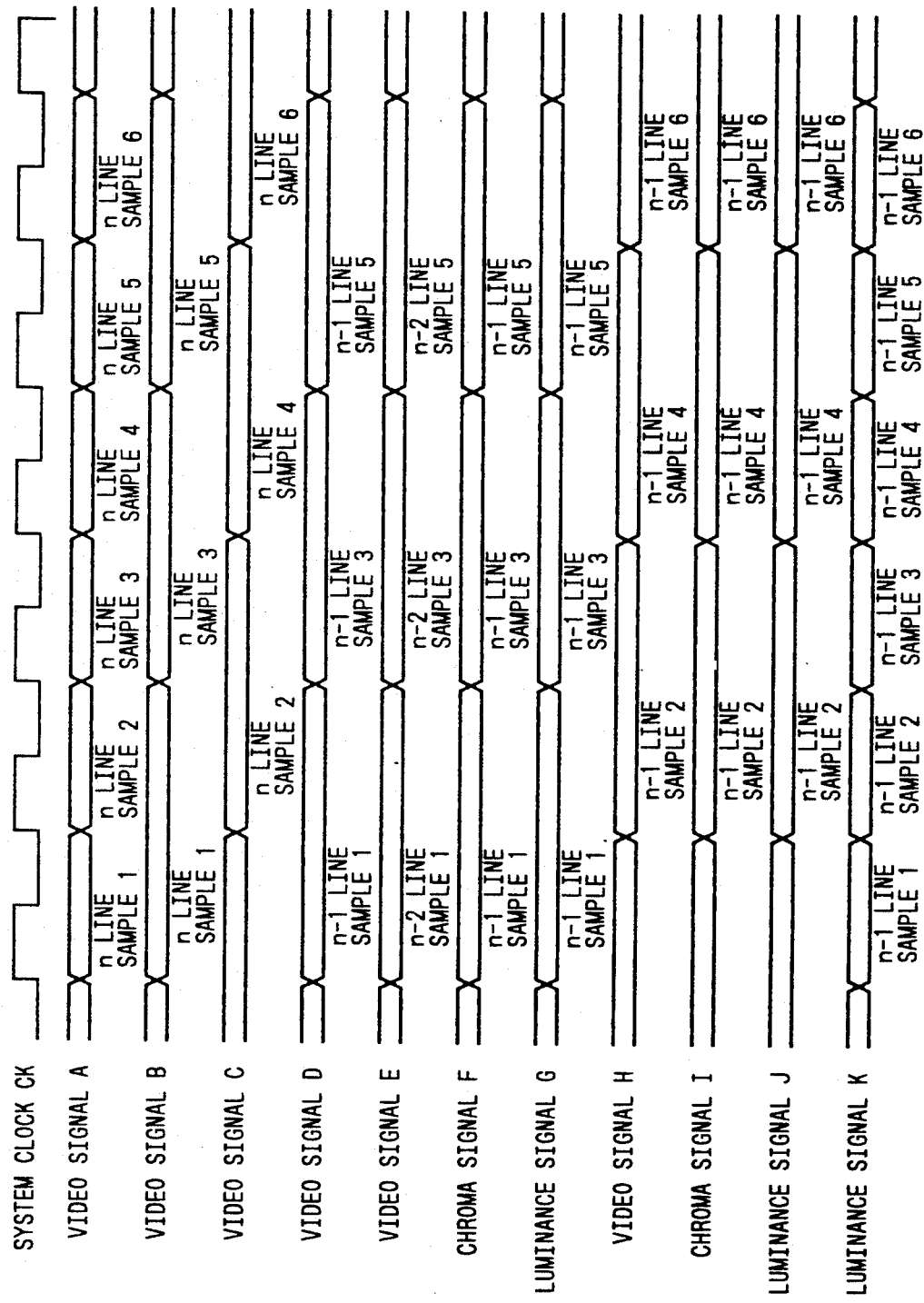
FIG. 3 is a timing diagram showing various signals in the comb filter of FIG. 2.

A further description will be given hereinafter with reference to FIGS. 2 and 3. The digitized input video signal A is derived from the analog video signal by the analog-to-digital conversion including the sampling process in which the analog video signal is sampled in response to each pulse of a system clock signal CK, that is, the analog video signal is sampled at the frequency of the system clock signal CK. Therefore, as shown in FIG. 3, the input video signal A has a sequence of samples which occur synchronously with the system clock signal CK. The separation circuit 11 separates the input video signal A into the video signals B and C. As shown in FIG. 3, the video signal B has a sequence of odd-number samples, while the video signal C has a sequence of even-number samples. The video signal B and C have a period equal to twice the period of the system clock signal CK. Specifically, the separation circuit 11 includes a switch and latches, the switch separating the input video signal A into odd-number samples and even-number samples in response to the system clock signal CK, the latches holding and outputting the odd-number samples and the even-number samples.

The line memory 1 delays the video signal B by a time corresponding to one line, so that the line memory 1 outputs the video signal D which is delayed from the video signal B by one line as shown in FIG. 3. The line memory 2 delays the video signal D by a time corresponding to one line, so that the line memory 2 outputs the video signal E which is delayed from the video signal D by one line as shown in FIG. 3. The video signals B, D, and E represent image information on three successive lines respectively. The chroma signal processor 3 processes the video signals B, D, and E, and separates the chroma signal (a color signal, a C signal) F by using the chroma vertical correlation that the chroma signal is inverted alternately with respect to lines. As shown in FIG. 3, the chroma signal F corresponds to the odd-number samples. The chroma signal F is outputted from the comb filter. The subtracter 4 substracts the chroma signal F from the video signal D, and thereby derives the first luminance signal G. As shown in FIG. 3, the first luminance signal G corresponds to the odd-number samples.

The line memory 12 delays the video signal C by a time corresponding to one line, so that the line memory 12 outputs the video signal H which is delayed from the video signal C by one line as shown in FIG. 3. The chroma signal F and the video signal H are offset in timing from each other by one period of the system clock signal CK, and the chroma signal F corresponds to the odd-number samples and the video signal H corresponds to the even-number samples as shown in FIG. 3. In view of this fact, the interpolation circuit 13 estimates the chroma components of the even-number samples from the chroma components of the odd-number samples represented by the chroma signal F through an interpolation process, and thereby the interpolation circuit 13 generates the chroma signal I which represents the chroma components of the even-number samples and which is in phase with the video signal H as shown in FIG. 3. The subtracter 14 subtracts the chroma signal I from the video signal H, and thereby derives the second luminance signal J. As shown in FIG. 3, the second luminance signal J corresponds to the even-number samples. The combining circuit 15 combines the first luminace signal G and the second luminance signal J into the final luminance signal K. Specifically, the combining circuit 15 includes a switch which periodically and alternately selects one of the first and second luminance signals G and J in response to the system clock signal CK. As shown in FIG. 3, the final luminance signal K has a sequence of all samples which occur synchronously with the system clock signal CK. The final luminance signal K is outputted from the comb filter. In this way, the input video signal A is separated into the chroma signal F and the luminance signal K.

As understood from FIG. 3, the separation of the input video signal A into the video signals B and C by the separation circuit 11 means a process of lowering the clock rate to a value corresponding to a half of the frequency of the system clock signal. Therefore, in the case where the sampling frequency related to the input video signal A is set equal to twice a typical prior art sampling frequency in order to double the horizontal resolution, the frequency of the signals processed by the line memories 1 and 2, the chroma processor 3, and the subtracter 4 agrees with the typical prior art sampling frequency so that these devices can be equal in structure to those in a prior art comb filter. In addition, the frequency of the signals processed by the line memory 12 and the subtracter 14 agrees with the typical prior art sampling frequency so that these devices can be equal in structure to typical prior art devices.

It should be noted that this embodiment may be modified as follows. In a first modification of this embodiment, the input video signal A is separated into three video signals, and the clock rate is lowered to a value corresponding to one third of the frequency of the system clock signal. In a second modification of this embodiment, the input video signal A is separated into four video signals, and the clock rate is lowered to a value corresponding to one fourth of the frequency of the system clock signal.

DESCRIPTION OF THE SECOND PREFERRED EMBODIMENT

Figure 4:
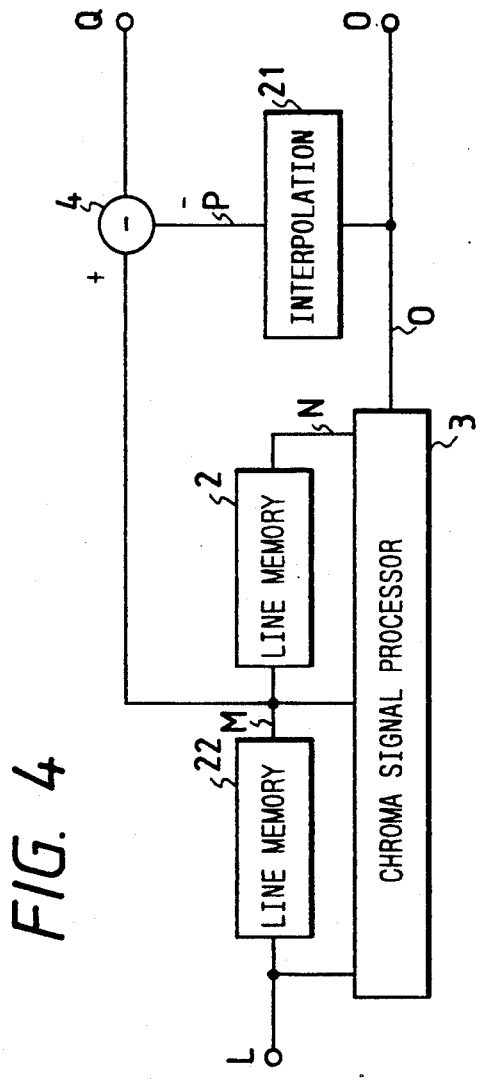
FIG. 4 is a block diagram of a comb filter according to a second embodiment of this invention.

With reference to FIG. 4, a comb filter of a second embodiment of this invention includes line memories 22 and 2, a chroma signal processor 3, a subtracter 4, and an interpolation circuit 21. The line memory 22 is designed so as to operate in response to a system clock signal CK fed from a clock signal generator (not shown). The frequency of the system clock signal CK is set equal to twice the frequency of a typical prior art system clock signal. The line memory 22 delays a digitized input video signal L by a time corresponding to one line. The digitized video signal L is derived from an analog video signal by an analog-to-digital conversion including a sampling process with a predetermined sampling frequency which equals the frequency of the system clock signal CK. The line memory 2 delays the output video signal M from the line memory 22 by a time corresponding to one line. The line memory 2 is designed so as to operate at a frequency equal to a half of the frequency of the system clock signal CK. The input video signal L, the output video signal M from the line memory 22, and the output video signal N from the line memory 2 represent image information on three successive lines respectively. The chroma signal processor 3 processes the video signals L, M, and N, and separates a chroma signal (a color signal, a C signal) O by using the chroma vertical correlation that the chroma signal is inverted alternately with respect to lines. The chroma signal O is outputted from the comb filter. The interpolation circuit 21 generates a new chroma signal P from the chroma signal O through an interpolation process. The subtracter 4 subtracts the chroma signal P from the output video signal M of the line memory 22, and thereby derives a luminance signal Q. The luminance signal Q is outputted from the comb filter. In this way, the input video signal L is separated into the chroma signal O and the luminance signal Q.

A further description will be given hereinafter with reference to FIGS. 4 and 5. The digitized input video signal L is derived from the analog video signal by the analog-to-digital conversion including the sampling process in which the analog video signal is sampled in response to each pulse of the system clock signal CK, that is, the analog video signal is sampled at the frequency of the system clock signal CK. Therefore, as shown in FIG. 5, the input video signal L has a sequence of samples which occur synchronously with the system clock signal CK. The line memory 22 delays the video signal L by a time corresponding to one line, so that the line memory 22 outputs the video signal M which is delayed from the video signal L by one line as shown in FIG. 5. The line memory 2 delays the video signal M by a time corresponding to one line, so that the line memory 2 outputs the video signal N which is delayed from the video signal M by one line as shown in FIG. 5. Since the line memory 2 operates at a frequency equal to a half of the frequency of the system clock signal CK, the output video signal N from the line memory 2 has a clock rate equal to a half of the clock rate of the system clock signal CK and has a sequence of odd-number samples as shown in FIG. 5. The video signals L, M, and N represent image information on three successive lines respectively. The chroma signal processor 3 processes the video signals L, M, and N, and separates the chroma signal (a color signal, a C signal) O by using the chroma vertical correlation that the chroma signal is inverted alternately with respect to lines. As shown in FIG. 5, the chroma signal O corresponds to the odd-number samples. The chroma signal O is outputted from the comb filter. As shown in FIG. 5, the output video signal M from the line memory 2 has a sequence of all samples and has a clock rate equal to the clock rate of the system clock signal CK, while the chroma signal O corresponds to the odd-number samples and has a clock rate equal to a half of the clock rate of the system clock signal CK. In view of this fact, the interpolation circuit 21 estimates the chroma components of the even-number samples from the chroma components of the odd-number samples represented by the chroma signal O through an interpolation process, and thereby the interpolation circuit 21 generates the chroma signal P which represents the chroma components of all the samples as shown in FIG. 5. The subtracter 4 subtracts the chroma signal P from the output video signal M of the line memory 2, and thereby derives the luminance signal Q. As shown in FIG. 5, the luminance signal Q has a sequence of all samples which occur synchronously with the system clock signal CK. The luminance signal Q is outputted from the comb filter. In this way, the input video signal L is separated into the chroma signal O and the luminance signal Q.

As understood from FIG. 5, the delay of the video signal M by the line memory 2 means a process of lowering the clock rate to a value corresponding to a half of the frequency of the system clock signal CK. Therefore, in the case where the sampling frequency related to the input video signal L is set equal to twice a typical prior art sampling frequency in order to double the horizontal resolution, the line memory 2 and the chroma processor 3 can be equal in structure to those in a prior art comb filter.

What is claimed is:

1. A comb filter for processing an input digital video signal which is derived from an analog video signal by a analog-to-digital conversion including a sampling process responsive to a system clock signal, the comb filter comprising:

separating means for separating the input video signal into a plurality of video signals which are offset from each other in timing and which have a clock rate equal to 1/N times a clock rate of the system clock signal where N denotes a predetermined natural number greater than 1;

first delaying means for delaying a first output signal of the separating means;

chroma signal processing means for separating a first chroma signal in response to the first output signal of the separating means and an output signal of the first delaying means;

first subtracting means for subtracting the first chroma signal from the output signal of the first delaying means;

second delaying means for delaying a second output signal of the separating means;

interpolating means for interpolating the first chroma signal into a second chroma signal to compensate for a difference in timing between the output signal of the second delaying means and the first chroma signal;

second subtracting means for subtracting the second chroma signal from the output signal of the second delaying means; and combining means for combining an output signal of the first subtracting means and an output signal of the second subtracting means into a luminance signal.

2. The comb filter of claim 1 wherein the first delaying means comprises a first delay circuit for delaying the first output signal of the separating means by a first predetermined delay quantity, a second delay circuit for delaying an output signal of the first delay circuit by a second predetermined delay quantity equal to the first predetermined delay quantity, wherein the chroma signal processing means comprises means for separating the first chroma signal in response to the first output signal of the separating means, the output signal of the first delay circuit, and an output signal of the second delay circuit, and wherein the first subtracting means comprises means for subtracting the first chroma signal from the output signal of the first delay circuit.

3. The comb filter of claim 2 wherein the first and second predetermined delay quantities correspond to an interval of one line, and wherein the second delaying means comprises a third delay circuit for delaying the second output signal of the separating means by a third predetermined delay quantity which corresponds to an interval of one line.

4. The comb filter of claim 2 wherein the first and second predetermined delay quantities correspond to an interval of one field or one frame, and wherein the second delaying means comprises a third delay circuit for delaying the second output signal of the separating means by a third predetermined delay quantity which corresponds to an interval of one field or one frame.

5. The comb filter of claim 1 wherein the natural number N is equal to 2.

6. A comb filter for processing an input digital video signal which is derived from an analog video signal by a analog-to-digital conversion including a sampling process responsive to a system clock signal, the comb filter comprising:
first delaying means responsive to the system clock signal for delaying the input video signal;
second delaying means, responsive to a clock signal having a frequency equal to 1/N times a frequency of the system clock signal, for delaying an output signal of the first delaying means, where N denotes a predetermined natural number greater than 1;
chroma signal processing means for separating a first chroma signal in response to the input video signal, the output signal of the first delaying means, and an output signal of the second delaying means;
interpolating means for interpolating the first chroma signal into a second chroma signal which has a clock rate corresponding to the system clock signal; and
subtracting means for subtracting the second chroma signal from the output signal of the first delaying means to separate a luminance signal.

7. The comb filter of claim 6 wherein the first delaying means comprises a delay circuit for delaying the input video signal by an interval of one line, and the second delaying means comprises a delay circuit for delaying the output signal of the first delaying means by an interval of one line.

8. The comb filter of claim 6 wherein the first delaying means comprises a delay circuit for delaying the input video signal by an interval of one field or one frame, and the second delaying means comprises a delay circuit for delaying the output signal of the first delaying means by an interval of one field or one frame.

9. The comb filter of claim 6 wherein the natural number N is equal to 2.

* * * * *